July 8, 1958     G. H. McLAFFERTY     2,841,955
DIRECTIONAL CONTROL FOR JETS
Filed Feb. 14, 1956
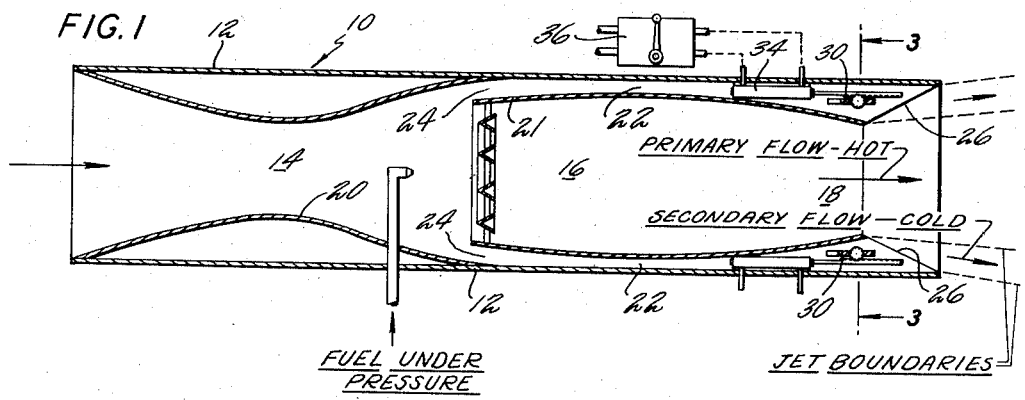
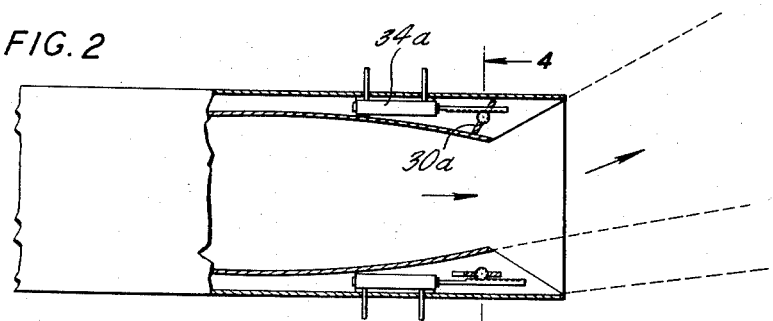
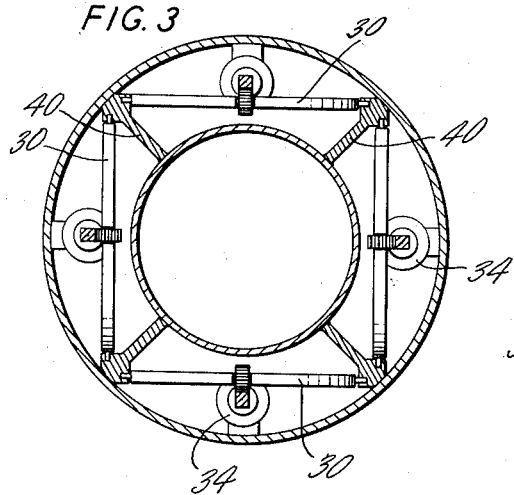 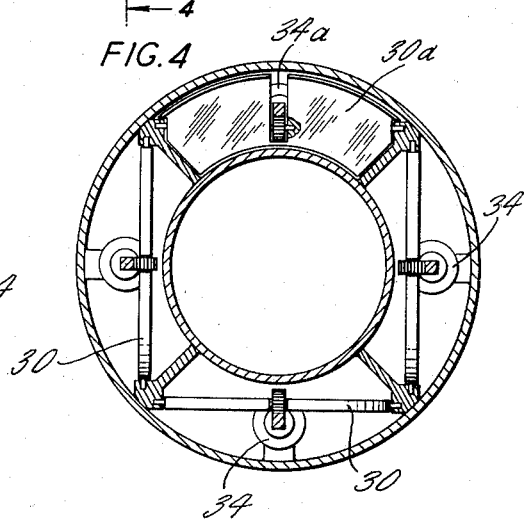
INVENTOR
GEORGE H. McLAFFERTY
BY *Leonard F. Weklind*
ATTORNEY

United States Patent Office 2,841,955
Patented July 8, 1958

2,841,955

DIRECTIONAL CONTROL FOR JETS

George H. McLafferty, Manchester, Conn., assignor to United Aircraft Corporation, East Hartford, Conn., a corporation of Delaware Application February 14, 1956, Serial No. 565,397

1 Claim. (Cl. 60—35.54)

This invention relates to jet propulsion devices and more particularly to means for controlling jet propelled vehicles.

It is an object of this invention to provide a jet propulsion device including means for deflecting the exhaust stream in several selected directions in order to control the direction of movement of the device.

It is a further object of this invention to utilize normally present cooling air for providing the directional control of the jet stream.

These and other objects of this invention will become readily apparent from the following detailed description of the drawing in which:

Fig. 1 is a schematic cross-sectional illustration of a power plant and jet exhaust incorporating the features of this invention.

Fig. 2 is an enlarged schematic illustration of the jet exhaust section showing the jet stream deflected in one direction.

Fig. 3 is a cross-sectional illustration taken along the line 3—3 of Fig. 1, and Fig. 4 is a cross-sectional illustration taken along the line 4—4 of Fig. 2.

Referring to Fig. 1, a ramjet power plant is generally indicated at 10. Although the ramjet is illustrated herein, for convenience the power plant may be a turbojet as well. The power plant 10 comprises an outer casing 12 which surrounds a convergent-divergent diffuser 14, a combustion chamber 16 and an exhaust nozzle 18. The inner wall 20 defines the convergent-divergent diffuser. Another inner wall 21 forms the combustion chamber and nozzle and is spaced radially inwardly from the casing 12 so as to form an elongated chamber 22 which passes cooling air from an annular inlet 24 through to an aft annular exit 26 which surrounds the hot gases being emitted from the nozzle 18.

In accordance with this invention, the cooling air normally is emitted in a symmetrical annular layer around the main stream so that these two streams can be considered to have boundaries as shown by the dotted lines in Fig. 1. The cooling air passage 22 may contain a plurality of valves 30 such as a butterfly valve circumferentially spaced therein for closing off a portion of the cooling air flow. These butterfly valves may be controlled by separate servo motors 34 operated by a control valve 36 well known in the art. As seen in Fig. 3, the annular cooling air duct 22 has four partitions as, for example, as shown at 40. This divides the cooling air exit into four quarter segments. In the position shown in Fig. 3 each of the butterfly valves 30 is aligned with the axis of flow such that cooling air is being symmetrically issued from the cooling air duct 22 so that the stream lines of the main hot stream and the cooling air are substantially as shown in Fig. 1.

When it is desired to deflect the main jet exhaust in a certain direction, one of the butterfly valves may be moved to a closed position as, for example, shown in Figs. 2 and 4. Thus, the butterfly valve 30A is moved by its servo motor 34A to the position shown. Under these conditions the flow of cooling air will be closed off in the upper quarterly segment of the cooling air duct so as to deflect the exhaust stream in a manner shown by the dotted lines in Fig. 2.

It is thus seen that a very efficient, simple and lightweight mechanism is provided for controlling the direction of a jet propulsion device or vehicle. This particular form of directional control is particularly adaptable to vertical takeoff type of aircraft and is further a highly efficient form of control which would be effective at high altitudes where normal directional controls of an aircraft become ineffective.

Although only one embodiment of this invention has been illustrated and described herein, it will become apparent that various changes and modifications may be made in the construction and arrangement of the various parts without departing from the scope of this novel concept.

What it is desired by Letters Patent is:

I claim:

In a jet engine having an air intake, a converging-diverging diffuser downstream of said intake, a casing forming a downstream continuation of said diffuser and forming a duct, an annular member in said duct spaced inwardly from said casing and forming a central combustion chamber, said casing and member also forming an annular cooling duct surrounding said combustion chamber, said annular member converging at its downstream end and said casing being uniform at its downstream end whereby said cooling duct enlarges at its downstream end, said casing having its trailing edge downstream of but adjacent to the downstream end of said member whereby an ejector action is obtained by the main stream withdrawing air from said cooling duct, partition means dividing the cooling duct into a plurality of annular segments, valve means in each of said segments and located in the enlarged portion of said cooling duct, and servo means for selectively closing one or more of said valves for varying the direction of flow from said main duct.

References Cited in the file of this patent

FOREIGN PATENTS 1,089,267    France _____ Sept. 29, 1954